United States Patent [19]

Priaroggia et al.

[11] Patent Number: 4,774,382
[45] Date of Patent: Sep. 27, 1988

[54] DIRECT CURRENT CABLE INSULATION WITH INSULATING COMPOSITION INCLUDING ELECTRONEGATIVE GAS

[75] Inventors: Paolo G. Priaroggia, Milan; Gianmario Lanfranconi, Trezzo Sull'Adda; Pietro Metra, Varese; Gianni Miramonti, Magenta, all of Italy

[73] Assignee: Societa' Cavi Pirelli S.p.A., Milan, Italy

[21] Appl. No.: 74,270

[22] Filed: Jul. 16, 1987

[30] Foreign Application Priority Data

Jul. 16, 1986 [IT] Italy ............................... 21138 A/86

[51] Int. Cl.$^4$ .............................................. H01B 9/02
[52] U.S. Cl. ..................................... 174/25 C; 156/53; 156/56; 174/25 R; 174/25 G
[58] Field of Search ................. 174/25 R, 25 C, 25 G; 156/53, 56

[56] References Cited

U.S. PATENT DOCUMENTS

| | | |
|---|---|---|
| 2,067,169 | 1/1937 | Beaver et al. ...................... 174/25 G |
| 2,149,771 | 3/1939 | Hunter et al. ...................... 174/25 G |
| 2,650,261 | 8/1953 | Davey ................................ 174/25 G |
| 2,914,430 | 11/1959 | King et al. .......................... 174/25 C |
| 3,844,860 | 10/1974 | Edwards ............................ 156/53 |
| 4,417,093 | 11/1983 | Occhini et al. ............... 174/25 C X |
| 4,491,684 | 1/1985 | Vecellio ........................ 174/25 C X |

FOREIGN PATENT DOCUMENTS

| | | |
|---|---|---|
| 627470 | 8/1949 | United Kingdom ............. 174/25 G |
| 776174 | 6/1957 | United Kingdom ............. 174/25 C |

Primary Examiner—Morris H. Nimmo
Attorney, Agent, or Firm—Brooks Haidt Haffner & Delahunty

[57] ABSTRACT

A direct current electric cable with a conductor, a semi-conductive screen around and contacting the conductor, a plurality of layers of insulation formed by tapes of insulating material around the semi-conductive screen, a further semi-conductive screen around the layers of insulation and a metal sheath around the further semi-conductive screen, the layers of insulation being impregnated with a non-migrating, insulation composition having a dropping point temperature at least 5° C. above the maximum operating temperature of the cable and having an electronegative gas dissolved therein, the gas having a coefficient of diffusion in the composition in the range from $3 \times 10^{-5}$ to $3 \times 10^{-6}$ cm$^2$/sec at temperatures below the dropping point temperature of the composition.

11 Claims, 1 Drawing Sheet

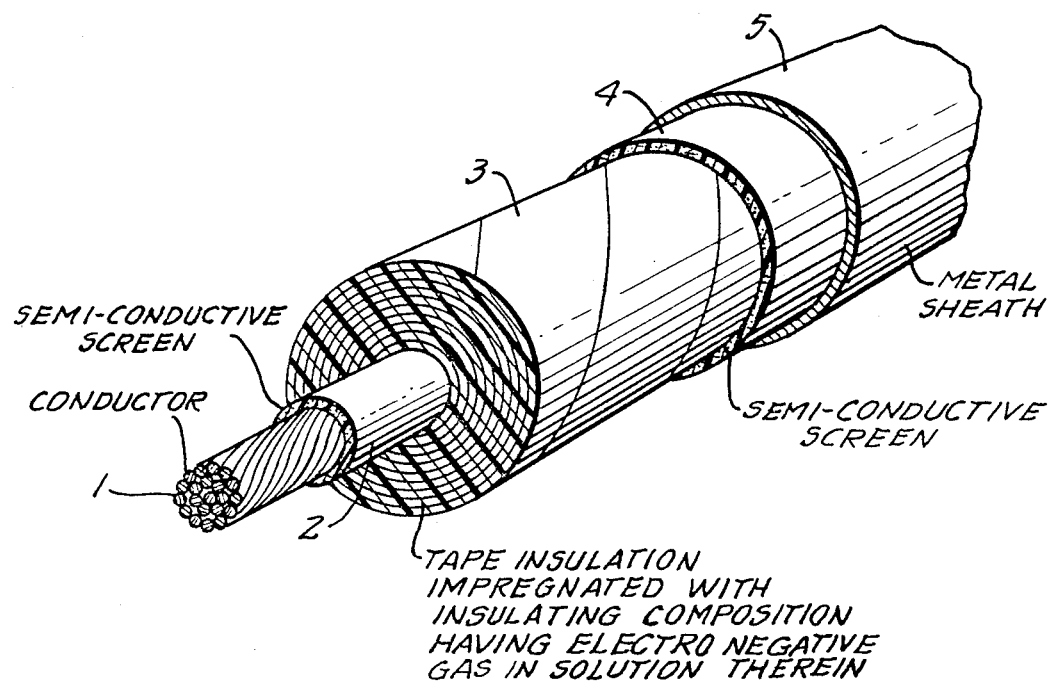

DIRECT CURRENT CABLE INSULATION WITH INSULATING COMPOSITION INCLUDING ELECTRONEGATIVE GAS

The present invention relates to direct current electric cables of the type in which the multi-layer insulation of the conductor, formed by a plurality of tape windings, is impregnated with a composition.

The conventional cables of such type, known as fully impregnated cables or cables having a fully impregnated insulation, are subject to risks of electrical perforation due to the presence, in the impregnated insulation of the conductor, of micro-cavities devoid of the composition which occur during the cable manufacture and which continuously change in size and position during service operation of the cable.

The micro-cavities in the insulation of a composition-impregnated cable originate during the cable manufacture, both on account of the high viscosity of the composition which remains high even at a comparatively high temperature and which hinders the perfect and total impregnation of the multi-layer insulation and on account of the thermal shrinkage suffered by the composition during the cooling which occurs after the impregnation of the multi-layer insulation and precedes the application of the metal sheath around the latter.

When the cable is put into service, it is subjected to heating and cooling cycles which have the effect of causing movements of the insulating composition mainly in the radial direction of the cable.

In particular, during the heating cycles, the composition impregnating the multi-layer insulation decreases in viscosity and is subjected to a thermal expansion greater than that of the other cable components. The consequent increase in the volume of the composition leads to a corresponding reduction in the number and dimensions of the micro-cavities.

During the cooling cycles, due to the shrinkage suffered by the composition, the micro-cavities reappear with changes in their position and size.

It is known that the micro-cavities in the composition impregnated insulation of a cable is detrimental particularly when they contain a gas at a very reduced pressure. In fact, in these conditions and under the action of the electric stresses, the micro-cavities become the sites of electrical discharges as the result of possible ionization of a low pressure gas which may lead to the perforation of the insulation and, therefore, to the breakdown of the cable.

In order to overcome this disadvantage, provision has been made to introduce a gas under pressure into direct current cables by placing the inside of the cable sheath into communication with tanks containing gas under pressure so as to ensure, in any condition, the filling of the micro-cavities with said gas.

These cables, known as "gas pressure insulation" cables, do not provide a satisfactory solution of the problem of eliminating the risk of perforation for various reasons.

To fill the micro-cavities with gas under pressure under all conditions of use of the cable, a high pressure is needed for the gas, for example, a pressure not lower than 14 bar inside the cable. In addition to being a constructional complication, this involves the presence of stresses in the sheath which are the higher with greater gas pressure so that there is the risk of a cable breakdown due to rupture of the sheath. Furthermore, the maximum permissible length for the cables having a fully impregnated insulation and involving gas pressure has values which are inversely proportional to the gas pressure, and in practice, said length is limited, in general, to not more than 5-10 km in order to limit the pressure losses of the gas during its flowing along the cable so as to prevent, in the event of sheath cracks, the penetration of moisture into the cable.

To increase the maximum permissible length, cables have been built with a multi-layer insulation constituted by windings of tapes of insulating material previously impregnated with the composition and with a duct in which a gas under pressure can flow through the cable along the duct. Even in this way, however, it has not been possible to provide cables having a length exceeding 50 km due to the fact that, after a certain time from the initial use of the cable, plugs of the composition are formed which close the duct provided for the longitudinal flowing of gas along the cable.

The described disadvantages restrict considerably the fields of application of the composition impregnated cables and, in particular, make their use quite complicated in the submarine field and exclude their use in the event of very extended cables, longer than 50 km.

One object of the present invention is to provide direct current electric cables having insulation which is fully impregnated with a composition and in which a satisfactory solution is given to the problem represented by risks of electrical perforation without any restriction in respect of the cable length and without introducing any construction complications.

In accordance with the object of the present invention, there is provided a direct current electric cable which is fully impregnated with composition and which comprises at least a conuctor covered by a semi-conductive screen, a multi-layer insulation impregnated with a composition containing in solution an electronegative gas and formed by a plurality of windings of tapes of insulating material, a semi-conductive screen covering the insulating layer and a metal sheath, characterized in that said composition is a non-migrating composition having a dropping point temperature which exceeds by at least 5° C. the maximum operating temperature which the cable may reach in use and in that the electronegative gas dissolved in the composition has, at a temperature lower than the dropping point of the latter, a coefficient of diffusion with respect to the composition - ranging between $3 \times 10^{-5}$ and $3 \times 10^{-6}$ cm$^2$/sec.

The present invention will be better understood from the following detailed description of preferred embodiments of the invention, which description should be considered in conjunction with the single figure of the accompanying drawing which shows in perspective view and with parts broken away, a portion of a cable constructed in accordance with the invention.

As shown in the drawing, a semi-conductive screen 2 obtained, for example, by the winding of a semi-conductive tape, is arranged around a conductor 1 formed by a plurality of wires, for example, copper wires, stranded together. A multi-layer insulation 3 impregnated with an insulating composition containing in solution an electronegative gas is arranged around the semi-conductive screen 2. The features of the composition and of the electronegative gas will be described hereinafter.

The multi-layer insulation 3, formed by a plurality of windings of insulating tapes made, for example, of paper, cellulose, plastic material and the like, is externally covered by a semi-conductive screen 4 having, for example, a structure identical to that of the semi-conductive screen 2.

A metal sheath 5 made, for example, of lead or aluminum, is around the semi-conductive screen 4. As stated, the multi-layer insulation 3 is impregnated with a composition containing an electronegative gas in solution therein.

In cables in accordance with the present invention, the composition and the therein dissolved electronegative gas have the characteristics set forth hereinafter.

The composition must be of the non-migrating type and must have a dropping point temperature higher by at least 5° C., and preferably, by at least 10° C., than the maximum temperature which the cable may reach in use.

In this specification, the expressions "non-migrating composition" and "dropping point temperature" have the following meanings. A "non-migrating composition" is a composition in which the viscosity curve, as a function of temperature, shows a sudden slope variation at a given temperature called the "dropping point temperature", the value of which is determined in accordance with ASTM Standards D 566-76. At temperatures higher than the temperature of the dropping point, the composition behaves as a viscous liquid, whereas at lower temperatures the composition behaves substantially as a solid body.

The electronegative gas dissolved in the composition must have, at temperatures lower than the dropping point of the composition, a coefficient of diffusion, with respect to said composition, in the range from about $3 \times 10^{-5}$ to about $3 \times 10^{-6}$ cm$^2$/sec.

Further characteristics of the composition and of the electronegative gas for a cable in accordance with the invention are the following:

(1) The shear modulus of elasticity G of the composition at a temperature in the range from 5° C. and 35° C. is greater than or equal to 0.8 kg/cm$^2$ to ensure dimensional stability of the existing microcavities even under the action exerted by the pressure of the therein contained electronegative gas; and (2) At a temperature higher than the "dropping point temperature" of the composition, the solutility of the electronegative gas is not less than $25 \times 10^{-2}$ normal cm$^3$ of gas/bar for each cm$^3$ of the composition so as to allow easy and prompt dissolving in the composition of considerable amounts of electronegative gas without requiring any modification of the plants at present used to produce cables having a composition impregnated, multi-layer insulation.

Once the above stated requirements are satisfied, both the chemical structure of the composition and the chemical nature of the gas may be of any desired nature, it being understood, however, that they must possess good dielectric properties and must be compatible with the materials forming the cable components with which they come into contact, namely, they must not reduce any of their electrical or mechanical characteristics.

On the basis of the above stated considerations regarding the composition and the gas, those skilled in the art will be able to determine, for each cable to be made, the substances to be utilized for avoiding any risk of electrical perforation during the use of the cable.

For example, to build up a direct current cable for which the maximum service temperature to be reached is 60° C., the electronegative gas which can be used is sulphur hexafluoride in association with a composition having the following formulation:

EXAMPLE 1

Polyisobutylene having an average molecular weight of 200,000: 2.5% by weight
Microcrystalline wax: 4% by weight
Mineral oil: 93.5% by weight Such composition has a dropping point temperature of 70° C., and the coefficient of diffusion of sulphur hexafluoride, with respect to such composition at temperatures lower than the dropping point temperature is in the range set forth hereinbefore.

The solubility of sulphur hexafluoride at temperatures exceeding the dropping point temperature of such composition is higher than the stated minimum admissible value for cables according to the invention.

In consequence of these features of the composition and of the electronegative gas, the cable manufacture does not involve any problems and does not require an modification of the plants at present used to build up cables having a composition impregnated insulation.

In fact, to produce cables according to the invention, the multi-layer insulation applied to the conductor is at first impregnated in the usual way in an impregnation tank (after it has been dried and degassed in said tank) with a composition having the stated characteristics for the composition of the invention and brought to a temperature higher than that of its dropping point temperature. Then, the electronegative gas having the characteristics for the gas used for the invention is introduced in the tank at a pressure of a few bar for the time sufficient to obtain the saturation of the composition which can be empirically determined. Although saturation of the composition with the electronegative gas is preferred because it provides the best results the presence of gas other than electronegative gases in small amounts can be tolerated provided that less than the best results are acceptable. In any event, at least 80% of all the gases dissolved in the compositions should be one or more of the electronegative gases mixed with the other gases.

After this time, the composition temperature is reduced to a value lower than the dropping point temperature and cooling is continued until a temperature slightly exceeding the room temperature is reached. After removal of the electronegative gas, the tank is opened, and the conductor, covered with the insulation impregnated with the composition containing the electronegative gas, is transferred to the apparatus for forming the metal sheath surrounding the insulation. During the time elapsing between the tank opening and the formation of the metal sheath around the insulation, there are substantially no losses of gas from the composition impregnating said insulation when the coefficient of diffusion of the gas throughout the composition is in the range of values for this feature.

Experimental tests described hereinafter demonstrate that by making direct current cables in accordance with the invention, the risk of electrical perforations at operating voltages is practically eliminated without the need of involving any construction complication, without being disadvantaged by length limitation and without having continuously to supply the cable under service with gas. The experimental tests adopted are those entitled "Loading Cycle and Polarity Reversal Tests'- 'recommended by the "Working Group 21-10, Study Committee No. 21 of CIGRE" and published in Issue No. 72 of the review entitled "Electra".

According to the method illustrated in said paper, sections of each cable under examination, 30 metres in length, are repeatedly subjected to 30 heating and cooling thermal cycles ranging between room temperature and the maximum service temperature established for that cable while increasing at every 30 cycles the value of the continuous voltage applied to the cables to determine the voltage at which electrical perforation takes place.

A plurality of cables constructed as described hereinafter were subjected to such experimental tests.

A first plurality of cables in accordance with the invention designed for a maximum service temperature of 60° C. and differing from one another only with respect to the characteristics (material, thickness, density, perviousness) of the tapes of insulating material used to build up the multi-layer solid insulation, were made.

In all the cables of this group, the multi-layer insulation was impregnated with the non-migrating composition previously described by way of example, and such composition was saturated with sulphur hexafluoride gas at a pressure of 2 bar and at a temperature of 120° C., i.e. a temperature higher than the dropping point temperature of 70° C. in accordance with the previously described construction process. Also, all the cables of this group included a conductor constituted by a copper strand having a diameter of 39 mm covered by a semi-conductive layer, by a multi-layer insulation having a thickness of 18 mm, an external semi-conductive screen and a lead sheath.

A second plurality of cables having a multi-layer insulation fully impregnated with a viscous composition, "viscous composition" meaning a composition the curve of viscosity as a function of temperature of which does not show sudden slope variations. The viscous composition used has a formulation differing from the composition used for the first plurality of cables only by the omission of microcrystalline wax. Otherwise, the structure of the cables of this second group and the tapes of insulating material used to form the multi-layer insulation were identical to those of the first plurality of cables according to the invention.

A third plurality of cables constructed in the same manner as the first plurality of cables, but having gas under pressure supplied thereto, the gas contained in the cable being nitrogen at a pressure of 14 bar, was also tested in accordance with such methods.

A fourth plurality of fully impregnated cables differing from those according to the invention only by the fact that the gas saturating the composition impregnating the insulation at 3 bar and at a temperature of 120° C. was nitrogen.

From the experimental tests carried out with said methods, it was ascertained that, in each cable group, the voltage at which the electrical perforation takes place varies within a range of values depending on the type of tapes of insulating material adopted to form the multi-layer insulation.

However, it was noted that, for any particular type of tapes of insulating material used to form the multi-layer insulation, the difference between the perforation voltage values ascertained for the cables of the various groups remained constant.

More specifically, the percentage differences in the perforation voltages observed for the various types of cables and those having an insulation fully impregnated with a viscous composition were those set forth in the following table:

| Type of cable | % increase of perforation voltage in comparison with cables having insulation fully impregnated with viscous composition |
| --- | --- |
| Cables according to the invention | 50% |
| Cables according to the invention with nitrogen under pressure of 14 bar applied to the cables | 48% |
| Cables according to the invention with nitrogen saturated composition | 20% |

From an examination of the experimental results, the conclusions set forth hereinafter can be made.

As compared to the cables having an insulation fully impregnated with viscous composition, the percentage increase of perforation voltage for the cables according to the invention, is of the same order of magnitude as that of the cables having an insulation formed by tapes previously impregnated with a composition of the invention in association with nitrogen under a pressure of 14 bar.

This means that with the cables according to the invention risks of electrical perforation during use are avoided in the same manner as cables having an insulation associated with a high gas pressure, without the previously indicated drawbacks of cables having gas under pressure applied thereto.

In particular, the cables according to the invention are not subject to any limitation in length and appear able to delay the penetration of moisture in the multi-layer insulation in the event of sheath cracks.

Other examples of non-migrating compositions suitable for use in making cables of the invention are as follows:

EXAMPLE 2

Polyisobutylene having an average molecular weight of 1000: 94% by weight
Microcrystalline wax: 4% by weight
Dropping point temperature: 90° C.

EXAMPLE 3

Mineral oil: 65.6% by weight
Microcrystalline wax: 3.5% by weight
Rosin: 30.9% by weight
Dropping point temperature: 80° C.

EXAMPLE 4

Mineral oil: 61% by weight
Microcrystalline wax: 10% by weight
Rosin: 29% by weight
Dropping point temperature: 90° C.

The coefficient of diffusion of sulphur hexafluoride in each of the compositions of Examples 2–4 is in the range from about $3 \times 10^{-5}$ to about $3 \times 10^{-6}$ cm$^2$/sec.

Examples of other electronegative gases, in addition to sulphur hexafluoride and nitrogen, which can be used are carbon dioxide and chlorinated-fluorinated hydrocarbon gases, such as FREON gases.

Although preferred embodiments of the present invention have been described and illustrated, it will be apparent to those skilled in the art that various modifications may be made without departing from the principles of the invention.

The embodiments of the invention in which an exclusive property of privilege is claimed are defined as follows:

1. A direct current electric cable comprising a conductor, a plurality of layers of insulation formed by a plurality of tape windings of insulating material around said conductor, said layers of insulation being impregnated with a non-migrating, insulating composition having a dropping point temperature which exceeds by at least 5° C. the maximum operating temperature of said cable and said non-migrating, insulating composition having dissolved therein an electronegative gas which, at a temperature lower than said dropping point temperature, has a coefficient of diffusion in said composition in the range from about $3 \times 10^{-5}$ to about $3 \times 10^{-6}$ cm$^2$/sec.

2. A direct current electric cable as set forth in claim 1 wherein the gases in said composition include at least 80% of an electronegative gas.

3. A direct current electric cable as set forth in claim 1 wherein said composition is saturated with at least one electronegative gas.

4. A direct current electric cable as set forth in claim 1 wherein said dropping point temperature exceeds said maximum operating temperature by at least 10° C.

5. A direct current electric cable as set forth in claim 1 wherein said dropping point temperature is greater than 60° C.

6. A direct current electric cable as set forth in claim 1 wherein said composition has a shear modulus of elasticity at 25° C. at least equal to 0.8 Kg/cm$^2$.

7. A direct current electric cable as set forth in claim 1 wherein the solubility of said electronegative gas is at least equal to $25 \times 10^{-2}$ normal cm$^3$ of gas/bar for each cm$^3$ of said composition.

8. A direct current electric cable as set forth in claim 1 wherein said cable further comprises a first semi-conductive screen intermediate said layers of insulation and said conductor and around and contacting said conductor, a second semi-conductive screen around said layers of insulation and a metal sheath around said second semi-conductive screen.

9. A method of making a direct current electric cable comprising a conductor, a plurality of layers of insulation formed by a plurality of tape windings of insulating material around said conductor, said layers of insulation being impregnated with a non-migrating, insulating composition having a dropping point temperature which exceeds by at least 5° C. the maximum operating temperature of said cable and said non-migrating, insulating composition having dissolved therein an electronegative gas which, at a temperature lower than said dropping point temperature, has a coefficient of diffusion in said composition in the range from about $3 \times 10^{-5}$ to about $3 \times 10^{-6}$ cm$^2$/sec, said method comprising:

winding said insulating material in tape form around said conductor;

placing said conductor with said insulating material therearound in an impregnation tank and drying and degassing said insulating material;

impregnating said insulating material in said tank with said composition; and subjecting said insulating material impregnated with said composition to said electronegative gas under a pressure greater than atmospheric pressure for a period of time sufficient to substantially saturate said composition with said electronegative gas.

10. A method as set forth in claim 9 wherein said layers of insulation impregnated with said composition are subjected to said electronegative gas in said impregnating tank.

11. A method as set forth in claim 10 wherein said layers of insulation impregnated with said composition are subjected to said electronegative gas with said composition at a temperature above said dropping point temperature thereof.

* * * * *